United States Patent [19]

Navazo

[11] Patent Number: 6,005,187

[45] Date of Patent: Dec. 21, 1999

[54] BOX FOR INSTALLING ELECTRICAL APPARATUS IN A RACEWAY

[75] Inventor: Juan Manuel Benito Navazo, Sant Cugat del Valles, Spain

[73] Assignee: Aparellaje Electrico, S.A., Barcelona, Spain

[21] Appl. No.: 09/031,737

[22] Filed: Feb. 27, 1998

[30] Foreign Application Priority Data

Mar. 26, 1997 [ES] Spain ..................................... 9700650

[51] Int. Cl.[6] ................................................. H02G 3/04
[52] U.S. Cl. ............................ 174/48; 220/3.3; 52/220.5
[58] Field of Search ................................. 174/48, 49, 50; 220/3.6, 3.3, 3.7, 3.8, 3.92, 3.94, 4.02; 52/220.1, 220.3, 220.5

[56] References Cited

U.S. PATENT DOCUMENTS

| | | | |
|---|---|---|---|
| 5,013,870 | 5/1991 | Navazo | 174/50 |
| 5,591,938 | 1/1997 | Navazo | 174/50 |
| 5,629,496 | 5/1997 | Navazo | 174/48 |

*Primary Examiner*—Dean A. Reichard
*Attorney, Agent, or Firm*—Staas & Halsey

[57] ABSTRACT

The box is generally parallelepipedic and is provided with a bottom from which there extend major walls and minor walls. The major walls have first tabs of the same height, which are terminated by a suspension lip extending outwardly from the box. The minor walls are provided with two second tabs, between which there is a third tab having a reinforced lower region and a retaining tooth for engagement with an internal support frame of a raceway.

9 Claims, 2 Drawing Sheets

BOX FOR INSTALLING ELECTRICAL APPARATUS IN A RACEWAY

DESCRIPTION

1. Field of the Invention

This invention relates to a box for installing electrical apparatus in a raceway, said box being adapted for engagement in an internal support frame which may be installed in an insulating raceway for electrical conductors, said raceway having a U-shaped rectangular section and being provided with respective longitudinal grooves in both walls thereof.

2. Prior Art

Such type of raceway is appropriate for assembly therein of an internal support frame for electrical apparatus, as disclosed in Spanish patent of invention no. 9301309, from which the documents EP 0 630 090 and U.S. Pat. No. 5,614,695 derive their priority. This internal frame forms the support member for the box for electrical apparatus to which the present invention relates.

As disclosed in the above patent, the specific purpose of the said support device consists of obtaining correct holding of the conventional boxes, attached to the bottom of the raceways, and/or of box-less apparatus and of covering the facing areas of the apparatus and the end edges of the cut cover, preventing the gaps formed in these mating areas and the irregular cuts of the cover from being seen and the unwanted entry of dust, damp and foreign bodies in the apparatus and/or in the raceway.

The arrangement of electrical trunking according to the above mentioned document U.S. Pat. No. 5,614,695 contemplates the use of raceways having longitudinal ribs in the bottom thereof for the attachment of conventional boxes, or the assembly of box-less apparatus; in this latter case particularly, the apparatus are not correctly separated from each other or from the rest of the electrical lines.

SUMMARY OF THE INVENTION

With a view to overcoming such drawbacks and achieving a correct installation of the electrical apparatus suitably insulated from any other apparatus that may be present and from the conductors installed in the raceway, the solution has been adopted of forming a box which is mounted in the support device contemplated in U.S. Pat. No. 5,614,695.

According to the invention, the box for electrical apparatus of the invention is characterized in that it is substantially parallelepipedic and is provided with a bottom from which there extend major walls and minor walls; said major walls comprising a plurality of first tabs of the same height, each of which is terminated in a suspension lip extending outwardly of the box; said minor walls comprising two second tabs and a third tab, which is flanked by the two second tabs; said third tab having a lower reinforced region and a retaining tooth adapted for engagement with said internal support frame.

BRIEF DESCRIPTION OF THE DRAWING

Further advantages and features of the invention will be appreciated from the following description in which there is described a preferred embodiment of the invention without any restrictive nature, with reference to the accompanying drawings in which.

DETAILED DESCRIPTION OF THE INVENTION

The box 1 is for the installation of electrical apparatus in a raceway 2 for electrical conductors 3. The raceway is of the type having a U-shaped rectangular section and provided with respective longitudinal grooves in the two side walls thereof for snap fitting of a lid and other items, such as an internal support frame 10. The internal support frame is described in U.S. Pat. No. 5,614,695.

Figure 1:
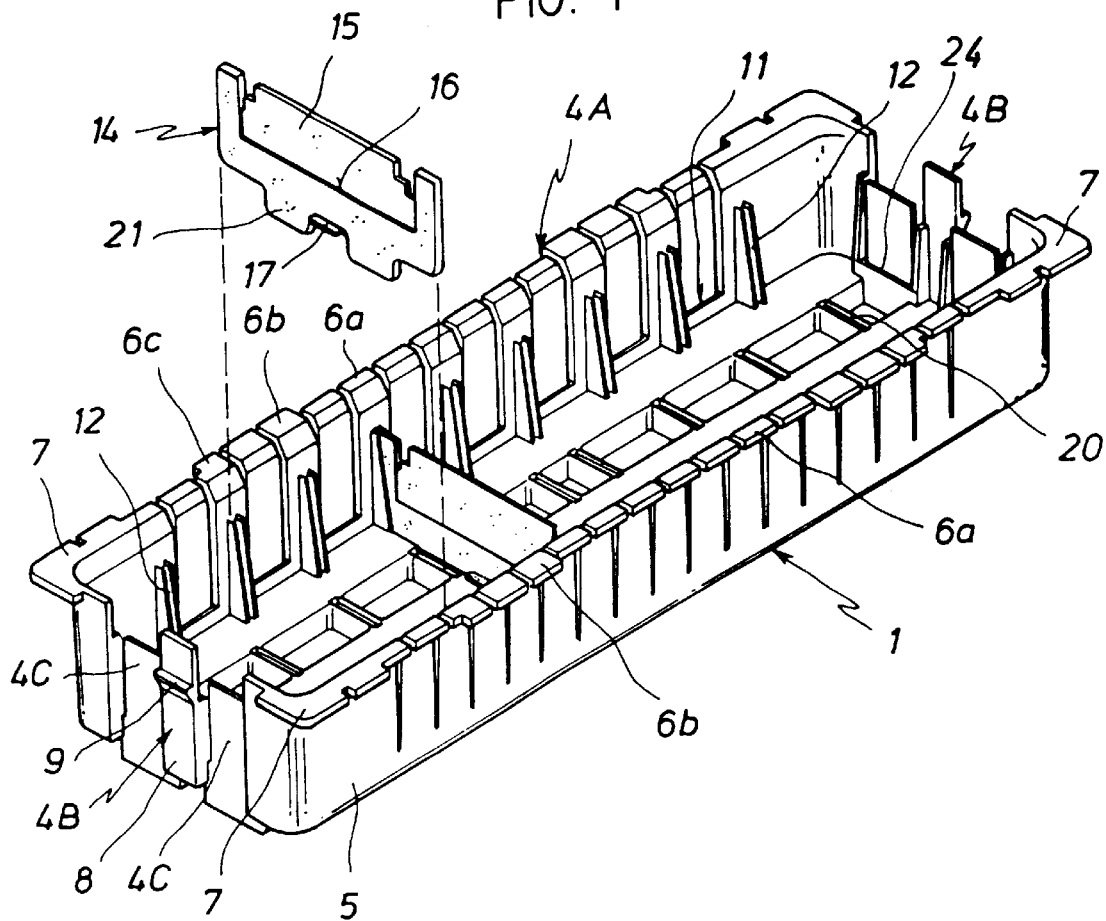
FIG. 1 is a perspective view of a box according to the invention, with a capacity for housing a plurality of electrical apparatus.

The box is shaped as an open trough, as shown in FIG. 1, of generally parallelpipedic shape, having a plurality of tabs 4 in the walls thereof. The first tabs 4A corresponding to the major walls 5 are of equal length and are terminated with respective suspension lips 6 which may be of varying shapes and lengths. Thus there are short lips 6a, long lips 6b and shaped lips 6c, the edges of which are provided with a notch or other irregularity.

Figure 4:
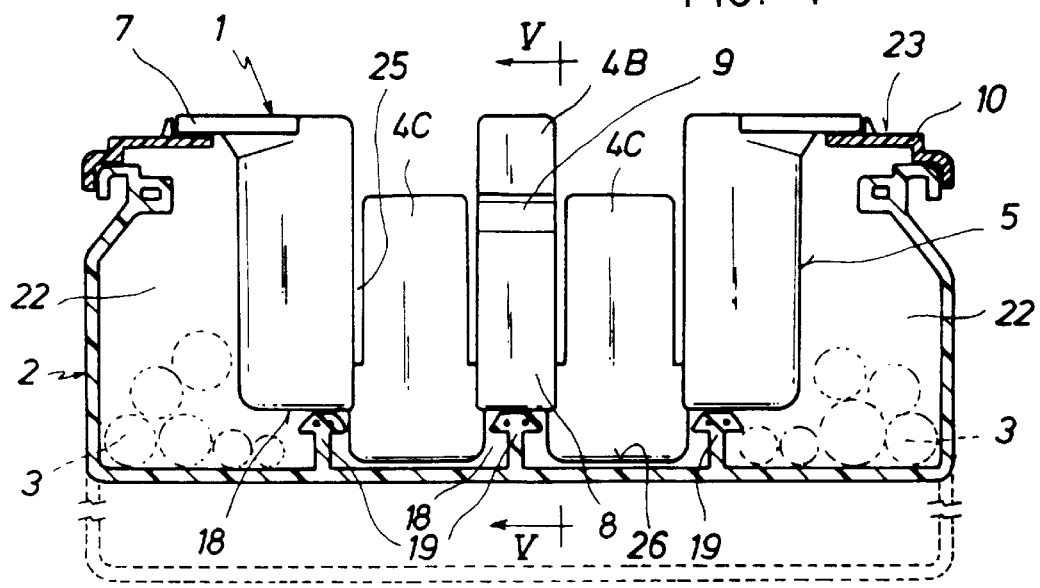
FIG. 4 is a front elevation view of the box of FIG. 1, mounted on an internal support frame installed in a raceway; the two last named items are shown in section.
Figures 2, 3:
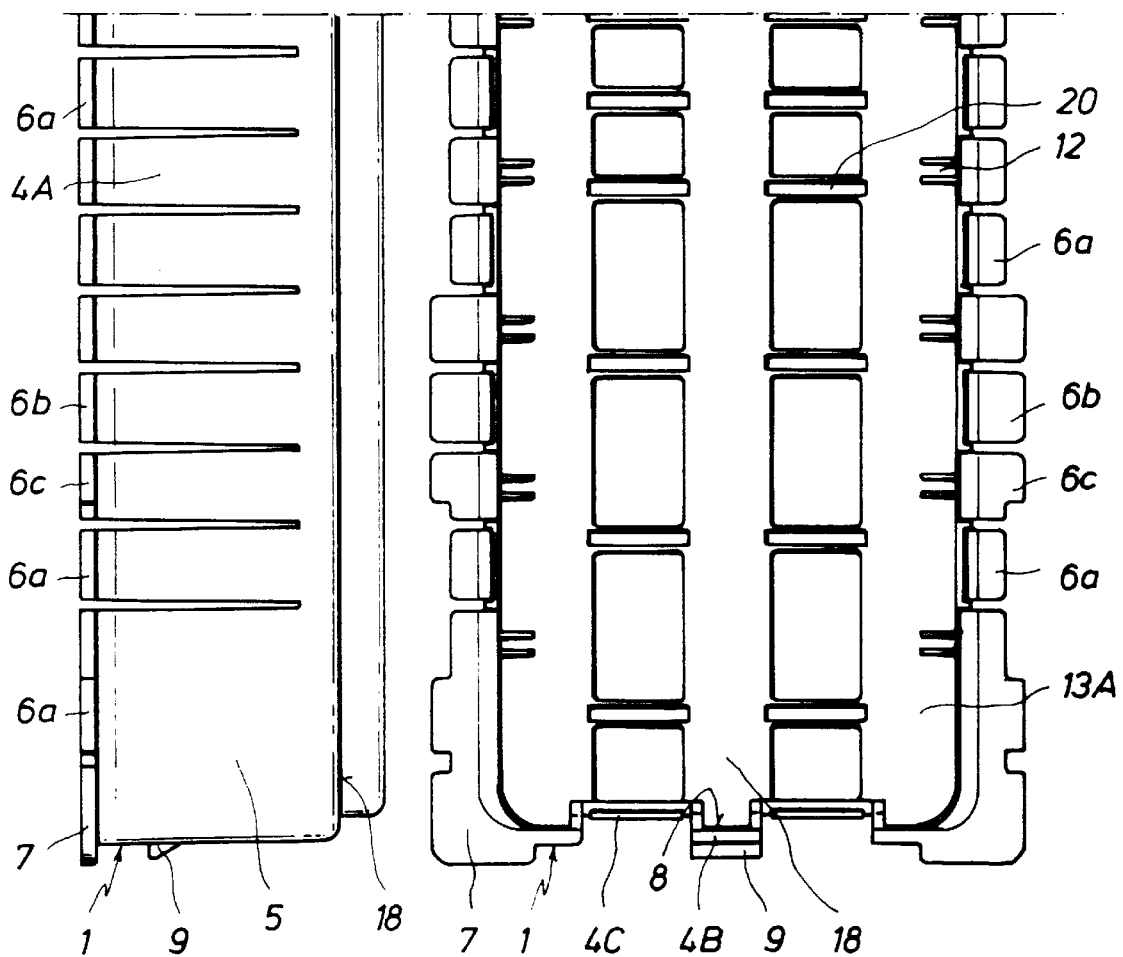
FIG. 2 is a plan view of one half of the box of FIG. 1.
FIG. 3 is a side elevation view of the half of the box of FIG. 1.

The lips 6 extend outwardly from the box 1 and the upper surface thereof is coplanar with the upper surface of corner members 7 of angled shape, provided in the four corners of the box 1. The lips 6 and the corner members 7 also are used to support the box 1 on the internal frame 10 (FIG. 4).

Figure 5:
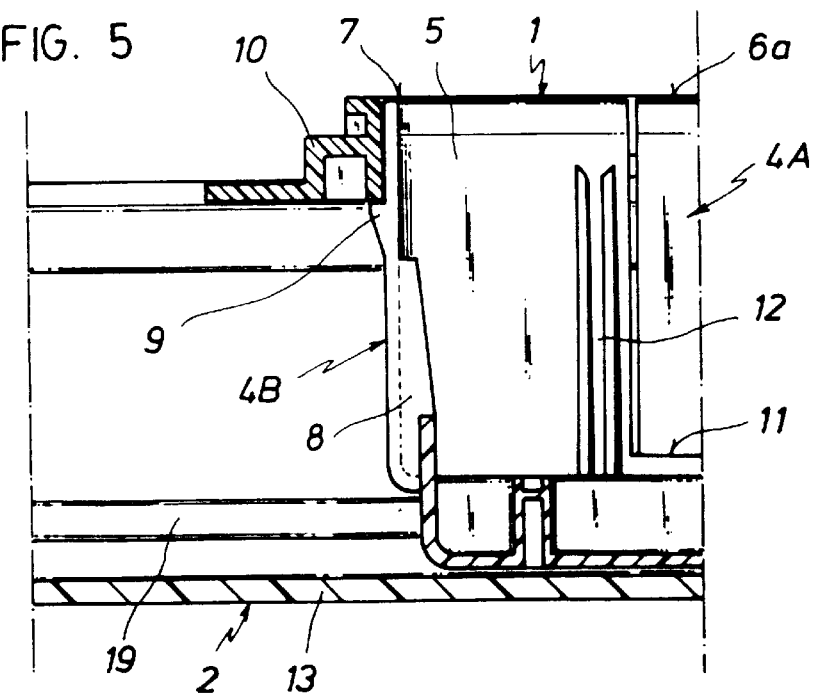
FIG. 5 is a cross section view on the line V—V of FIG. 4.

On the other hand, the tabs corresponding to the minor walls do not have lips. The third or center tab 4B is of the same height as the first tabs 4A of the major walls 5, is provided with a lower reinforced region 8 and also has a retaining tooth 9 engageable with the said internal support frame 10 (FIG. 5), although on a side thereof other than the one supporting the lips 6.

The second tabs 4C adjacent the third tab 4B, are shorter and wider than the third tab 4B and are also situated more inwardly of the box 1 than the third tab 4B. It is also preferred that they have a weakened lower region 24 (FIG. 1) allowing them to be easily broken off.

The purpose of the lower height, their more inward positioning and the ease of rupture of the second tabs 4B is to allow the passage thereby of the electrical conductors 3 installed in a raceway 2 and which it is desired should enter lengthwise (i.e., in the direction from one minor wall to the other) of the box 1, by penetrating, as the case may be, through the spaces 25 (FIG. 4) formed in the minor walls by the inward location of the second tabs 4C.

Some of the first tabs 4A of the major walls 5 are thinner or have a line of weakening 11, whereby they are flexible and/or removable; the remaining first tabs 4A are generally rigid and not removable, having a pair of internal brackets 12 which are integral with the first tab 4A and the bottom 13A of the box 1.

The side surfaces of each bracket 12 of a major wall 5 are respectively coplanar with the side surfaces of a bracket 12 of the other facing major wall 5, such that each pair of brackets 12, together with the corresponding pair of brackets 12 of the other side, form a guide for inserting a partition wall 14. The side and lower edges of a partition wall 14 are shaped to engage the side internal and lower internal surface of the box 1.

The said partition walls 14 are provided with a region 15 (bounded by the line 16) which is thinner. They are also preferably provided with flaps 17 perpendicular thereto and (in the position of use) parallel to the bottom 13A of the box 1.

The box 1 is preferably provided longitudinally with raised regions 18 the bottom of which is at a higher level than the contiguous regions. The raised regions 18 are adapted for resting on longitudinal ribs or rails 19 optionally provided on the bottom 13 of the raceway 2. Nevertheless, the bottom 13 of the raceway 2 may also be smooth, as shown in phantom in FIG. 4.

The depressed longitudinal regions 26 comprised between two regions 18 are preferably divided into compartments by double partitions 20 in which appendices 21 of the lower edge of the partition walls 14 may be inserted. It is also contemplated that the bottom 13A of the box 1 is flat and that it may optionally have engagement grooves (not shown) as a continuation of the brackets 12.

Spaces 22 are formed between the outer sides of the major walls 5 and/or the bottom 13A of the box 1 and the inner surfaces of the walls of the raceway 2 and/or the bottom 13 thereof for the passage and laying of electrical conductors.

The perimetral shape of the lips 6 of the first tabs 4A and of the corner members 7 is determined by any relief features that the seating surface 23 of the internal support frame 10 may have.

What I claim is:

1. A box for installing electrical apparatus in a raceway, said box being adapted for engagement in an internal support frame which may be installed in an insulating raceway for electrical conductors, said raceway having a U-shaped rectangular section and being provided with respective longitudinal grooves in both walls thereof, said box being substantially parallelepipedic and being provided with a bottom from which there extend major walls and minor walls; said major walls comprising a plurality of first tabs of the same height, each of which is terminated in a suspension lip extending outwardly of the box; said minor walls comprising two second tabs and a third tab, which is flanked by the two second tabs; said third tab having a lower reinforced region and a retaining tooth adapted for engagement with said internal support frame.

2. The box of claim 1, comprising corner members situated at the same level as said suspension lips.

3. The box of claim 1, wherein at least one of said first tabs is flexible.

4. The box of claim 1, wherein at least one of said first tabs is removable.

5. The box of claim 1, wherein at least one of said first tabs is integral with a pair of brackets in turn integral with said bottom.

6. The box of claim 5, wherein at least both brackets of one same pair of brackets of a major wall are provided with side surfaces which are respectively coplanar with the side surfaces of two brackets of another pair of brackets on the other major wall.

7. The box of claim 6, wherein both brackets of one same pair of brackets of one major wall and both brackets of respectively coplanar surfaces of the other major wall form a guide for the insertion of a partition wall, which is provided with side and lower edges adapted to maintain simultaneous engagement with the box.

8. The box of claim 7, wherein said partition walls are provided with a thinner region, with flaps oriented perpendicularly to the partition walls and appendices extending from said lower edge.

9. The box of claim 1, wherein said bottom is provided with at least one depressed longitudinal region divided into compartments by transverse double partitions which are adapted for the insertion therein of said appendices.

* * * * *